United States Patent [19]

Burger

[11] Patent Number: 5,187,498

[45] Date of Patent: Feb. 16, 1993

[54] INK SUPPLY CONTAINER AND SYSTEM

[75] Inventor: William R. Burger, Fairport, N.Y.

[73] Assignee: Xerox Corporation, Stamford, Conn.

[21] Appl. No.: 735,233

[22] Filed: Jul. 24, 1991

[51] Int. Cl.⁵ .............................................. B41J 2/175
[52] U.S. Cl. ................................. 346/140 R; 222/105
[58] Field of Search ....................... 346/140 R, 140 A; 73/314; 116/204, 227; 222/92, 95, 105

[56] References Cited

U.S. PATENT DOCUMENTS

| | | | |
|---|---|---|---|
| 3,708,798 | 1/1973 | Hildenbrand et al. | 346/140 R |
| 4,412,232 | 10/1983 | Weber et al. | 346/140 R |
| 4,889,442 | 12/1989 | Takagi et al. | 346/140 A |
| 5,040,002 | 8/1991 | Pollacek et al. | 346/140 R |

FOREIGN PATENT DOCUMENTS 0141562  6/1986  Japan .............................. 346/140 R

*Primary Examiner*—Benjamin R. Fuller
*Assistant Examiner*—Alrick Bobb
*Attorney, Agent, or Firm*—Oliff & Berridge

[57] ABSTRACT

An ink supply for an ink jet printer, preferably comprises a bellows filled with liquid ink. The bellows has first and second opposite end walls and a bellowed side wall attached to and extending between the first and second end walls to define a variable volume ink chamber. The bellows is movable between an extended position and a contracted position and is biased toward the contracted position. The first end wall includes an outlet which, when opened, permits the ink to be expelled from the bellows at a low pressure. A rigid frangible shell is provided to support the bellows and to retain the bellows in an extended position during storage and prior to use. The bellows may include a magnet which, when used in combination with a printer and a sensing device, can detect and signal a near empty or empty ink supply condition.

25 Claims, 6 Drawing Sheets

INK SUPPLY CONTAINER AND SYSTEM

BACKGROUND OF THE INVENTION

1. Field of the Invention

The present invention relates to a disposable ink supply for a liquid ink-jet printer and to a liquid ink jet printing system, and in particular to such an ink supply and system which is clean to load and unload and/or which includes safeguards to protect against use if the ink supply is improperly installed or empty.

2. Description of Related Art

U.S. Pat. Nos. 4,074,284 to Dexter et al and 4,506,276 to Kyser et al disclose an ink supply system and printhead for an ink jet printer. A disposable ink source includes a collapsible elastic balloon which supplies ink at high pressure through elastic action without external pumps or springs. A pressure sensor and a valve control system compensate for variations in pressure and generate a signal that disarms the printer when the pressure of the ink supplied by the source becomes low.

U.S. Pat. No. 4,989,754 to Grasso et al discloses a toner level detection system in which a toner cartridge is modified by the addition of a low toner sensing mechanism internal to the cartridge. An arm having a magnet secured thereto is pivotally mounted in the cartridge. When the cartridge is full, a suspended end of the arm is partially submerged in the toner and is subjected to a viscous drag force which prevents the arm from returning to a vertical position. When a sufficiently low toner level occurs, the arm returns to a vertical position in alignment with a switching circuit which is closed by the action of the magnet. The circuit generates audible or visual signals to an operator of a low toner condition.

A number of ink jet printers exist where the ink is conveyed from a source of ink to the ink ejecting nozzles by capillary action. See, for example, the above described U.S. Pat. Nos. 4,074,284 and 4,506,276, as well as U.S. Pat. Nos. 4,463,359 to Ayata et al, 4,601,777 to Hawkins et al, and 4,774,530 to Hawkins, the disclosures of which are incorporated herein by reference. Since these systems utilize capillary action instead of a positive pressure to eject the ink from the nozzles, it is difficult to remove any air which might become ingested in the ink supply system. Accordingly, it is desirable to provide safeguards against the introduction of air into these ink supply systems, which is likely to occur when the printer is permitted to continue to run when an ink supply is empty or not installed properly.

Thus, the need exists for a liquid ink supply for a printer which is disposable, clean to unload and load, includes a failsafe system against any attempt to run when dry and can indicate in advance when it is about to become empty. The need also exists for an ink supply which can consistently deliver ink at a low pressure to a reservoir of a printer that operates to supply ink to nozzles by capillary action, so that the ink supply does not overwhelm the system. It is also preferable to provide an ink supply for supplying ink at a low pressure without external valves or controls to reduce the pressure.

OBJECTS AND SUMMARY OF THE INVENTION

It is an object of the present invention to provide a disposable liquid ink supply for an ink jet printer which is easy and clean to load and unload from the printer.

It is another object of the present invention to provide a liquid ink supply system which reduces the likelihood of air being introduced into the system.

It is another object of the present invention to provide a liquid ink supply system which will not operate unless a liquid ink supply is properly installed in the printer.

To achieve the foregoing and other objects, and to overcome the deficiencies of the prior art, an ink supply and an ink supply system for an ink jet printer is provided. The ink supply is disposable, and preferably supplies ink at a low pressure so as not to overwhelm the remainder of the ink supply system when that system operates by supplying ink to printhead nozzles by capillary action. Preferably, the ink supply will not permit ink to exit through its outlet unless an activating mechanism associated with the ink supply is actuated by an operator. The ink supply also includes structure for blocking the outlet when the supply of ink approaches empty so that air is not ingested into the ink supply system, and so that the ink supply can be removed from the printer cleanly.

The ink supply and system can also be provided with structure which sounds an alarm and/or prevents the printhead of the printer from being actuated when the amount of ink in the ink supply is low, or when the ink supply is not properly inserted into the printer.

In a preferred embodiment, the ink supply is a bellows. The bellows has first and second opposite end walls and a bellowed side wall attached to and extending between the first and second end walls to define a variable volume ink chamber. The bellows is movable between an extended position and a contracted position and is biased toward the contracted position. The first end wall includes an outlet which, when opened, permits ink to be expelled from the bellows at a low pressure.

A rigid shell is provided to support the bellows and to retain the bellows in the extended position during storage and prior to use. A frangible portion of the rigid shell is attached to the second end of the bellows, and acts as the activating mechanism by preventing the bellows from contracting until the frangible portion is broken away from a remainder of the shell. Once the frangible portion of the shell is removed, the bellows is free to contract to expel ink through the ink outlet at a low pressure which is about equal to the biasing force of the bellows.

A magnet can be provided adjacent to the second end wall of the bellows. This magnet actuates a proximity switch, located in an ink supply area of the printer housing adjacent to the bellows outlet, when the second end wall of the bellows moves to a position close to the first end wall indicating that the ink supply is almost empty. This proximity switch prevents the printhead from being actuated when the ink supply is almost empty so that air is not ingested into the printhead.

As an alternative, a second type of switch can be provided in the ink supply area of the printer housing for preventing the printhead from being actuated if the container is near empty, if the container is not properly loaded, or not loaded at all. This second type of switch operates based upon the contact that it makes with the movable bellowed side wall of the ink supply.

Additionally, the rigid shell can be constructed to have dimensions which prevent a door covering the ink supply area in the printer from closing unless the frangible portion of the rigid shell is removed. A third switch can be provided in the door to prevent the printhead from being actuated unless the door is closed. This prevents the printhead from being actuated unless the ink supply is properly loaded and activated.

BRIEF DESCRIPTION OF THE DRAWINGS

The invention will be described in detail with reference to the following drawings in which like reference numerals refer to like elements and wherein.

DETAILED DESCRIPTION OF THE PREFERRED EMBODIMENTS

Figure 1:
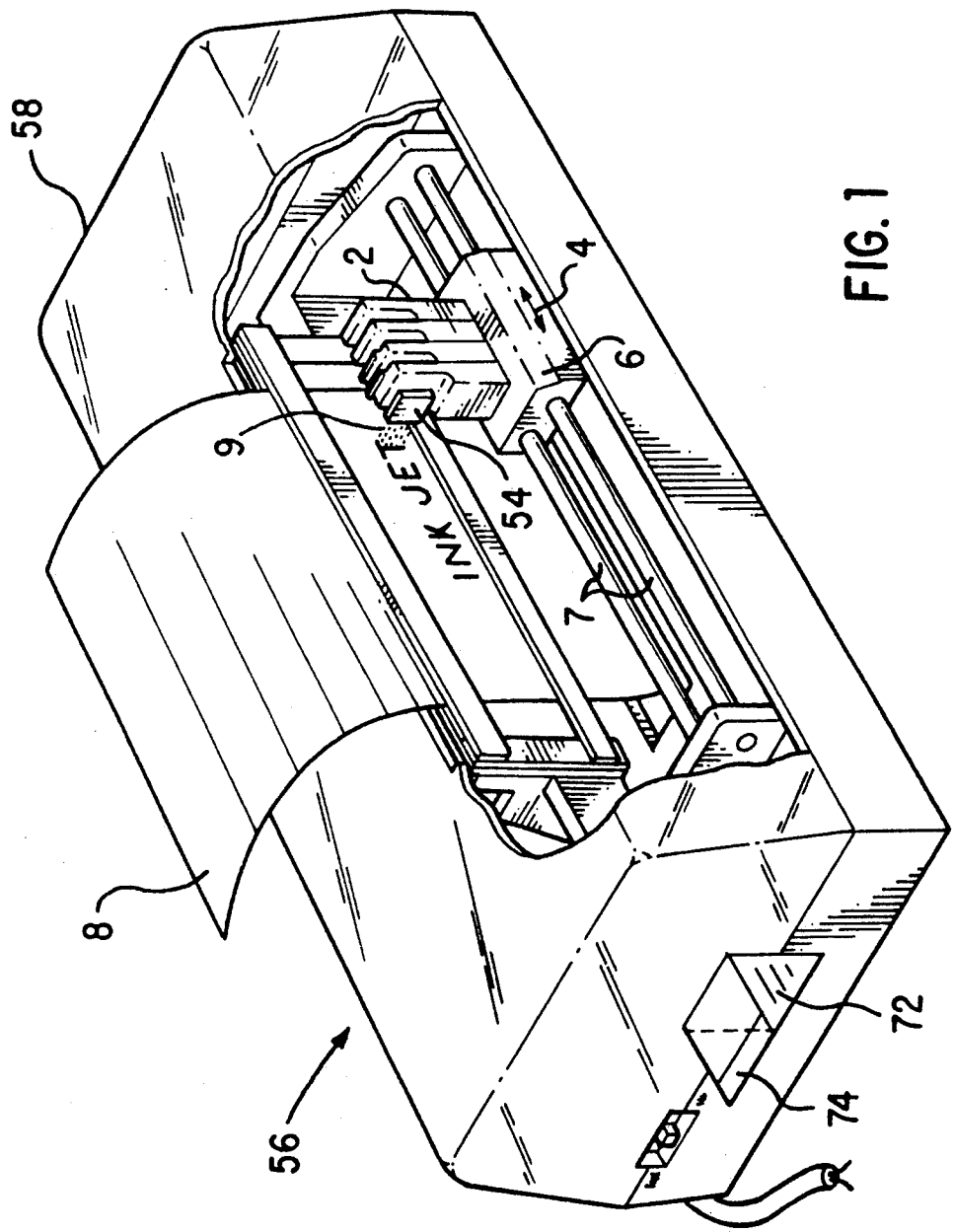
FIG. 1 is a schematic perspective view of a thermal ink jet printer having a plurality of ink cartridges with integral printheads.

Referring to FIG. 1, a thermal ink jet printer 56 is shown. Several ink supply cartridges 2, each with an integrally attached thermal printhead 54, are mounted on a translatable carriage 6. During the printing mode, the carriage 6 reciprocates back and forth on guide rails 7 as depicted by arrow 4. A recording medium 8, such as, for example, paper, is held stationary while the carriage is moving in one direction and, prior to the carriage moving in a reverse direction, the recording medium is stepped a distance equal to the height of the stripe of data printed on the recording medium by the thermal printheads. Each printhead has a linear array of nozzles which are aligned in a direction perpendicular to the reciprocating direction of the carriage. The nozzles confront the recording medium and are spaced therefrom a distance of, for example, between 0.01 and 0.2 inch. The nozzle center-to-center spacing is about 3 mils, so that 300 spots pixels per inch may be printed on the recording medium. The thermal printheads propel ink droplets 9 toward the recording medium whenever droplets are required, during the traverse of the carriage, to print information. The signal-carrying ribbon cables attached to thermals of the printheads have been omitted for clarity. The required number of nozzles is a design choice based upon the desired number of traverses back and forth across the recording medium to print a full page of information.

The printer 56 can print in a single color (e.g., black), wherein all of the cartridges 2 are attached to a common ink supply, or can print in multiple colors, wherein each of the cartridges 2 is attached to a different color ink supply. See, for example, U.S. Pat. No. 4,833,491, the disclosure of which is incorporated herein by reference.

For ease in understanding the present invention, the described example involves a single color printer. Accordingly, only a single ink supply is required. Each cartridge 2 includes a relatively small ink reservoir 52 (see FIG. 3) therein. Ink is supplied from reservoir 52 to the printhead nozzles by capillary action. Accordingly, the ink pressure supplied by each reservoir is slightly negative so that ink is not forced out of the nozzle outlets. The negative pressure is obtained by locating the reservoirs 52 slightly below the printheads 54. Such an arrangement is conventional.

The printer 56 includes a housing 58 which contains the various components of the printer.

The present invention provides a disposable ink supply for supplying ink to the reservoirs 52 of each cartridge 2. The ink supply outputs ink at a low pressure such as, for example, one inch of $H_2O$ or less, preferably less than 0.25 inches of $H_2O$. This low pressure is just sufficient to replenish reservoirs 52, without overwhelming the system. Accordingly, the ink supply is also located below the printheads 54. Printer housing 58 includes a door 74 covering an ink supply area 72 into which the ink supply is inserted.

Control of pressure in devices with or without a disposable ink supply is generally accomplished by locating the supply at a lower elevation in the machine than the print element (printhead), which creates a negative pressure head. Capillary action is then the only method of moving the ink from the supply to the print element. Collapsible ink supplies, plastic bags for example, usually do not impart positive pressure to the ink system. In the present invention, a slight positive pressure is generated by the ink supply. However, compensation for this very slight positive pressure can be provided by increasing the elevation between the ink supply and the print element in the initial design of the printer. No valves or other pressure control structure is required between the supply and the print element.

Figure 2:
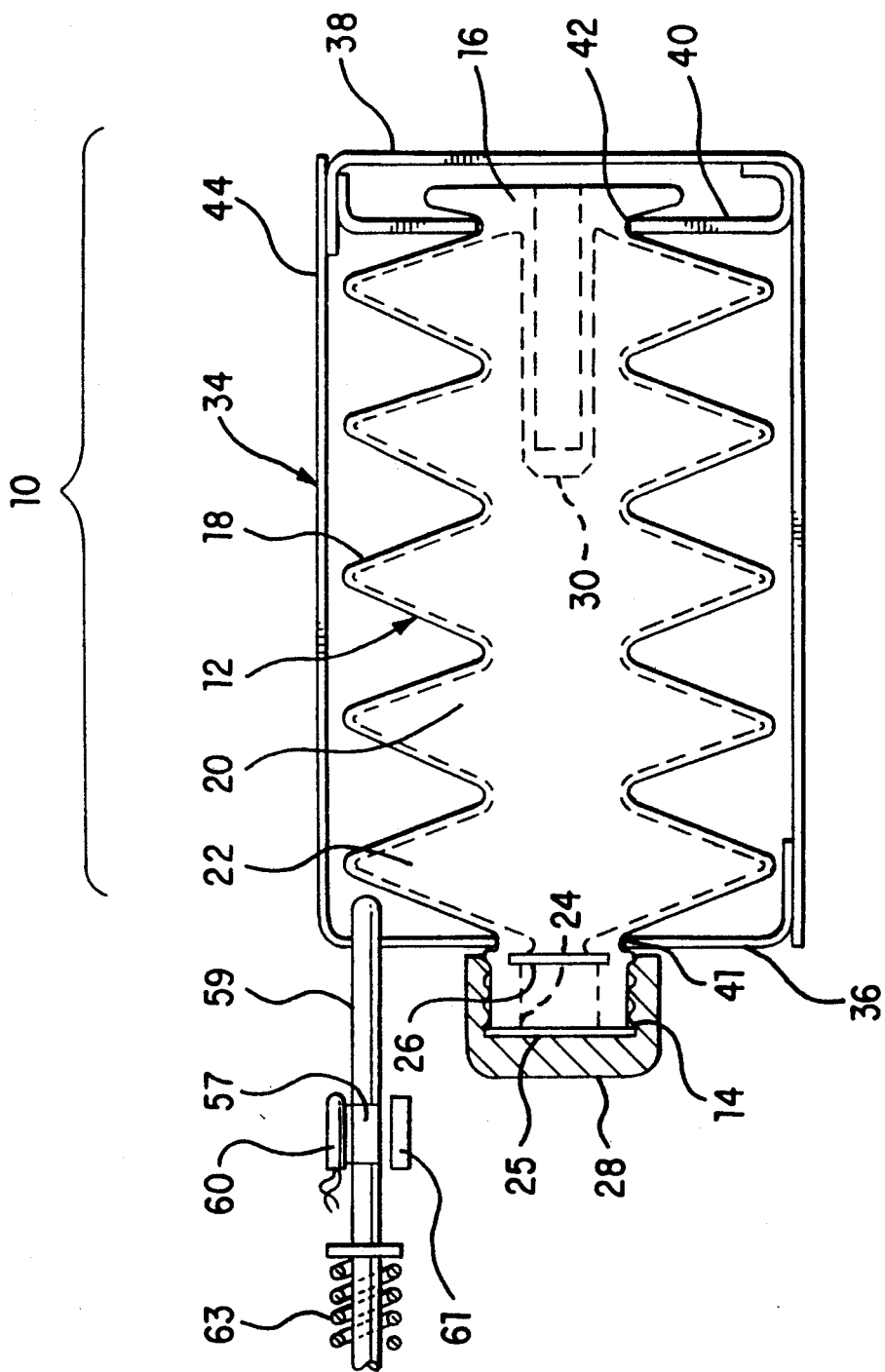
FIG. 2 is a cross-sectional side view of an ink supply in an extended position and a sensing mechanism according to one embodiment of the present invention.
Figure 3:
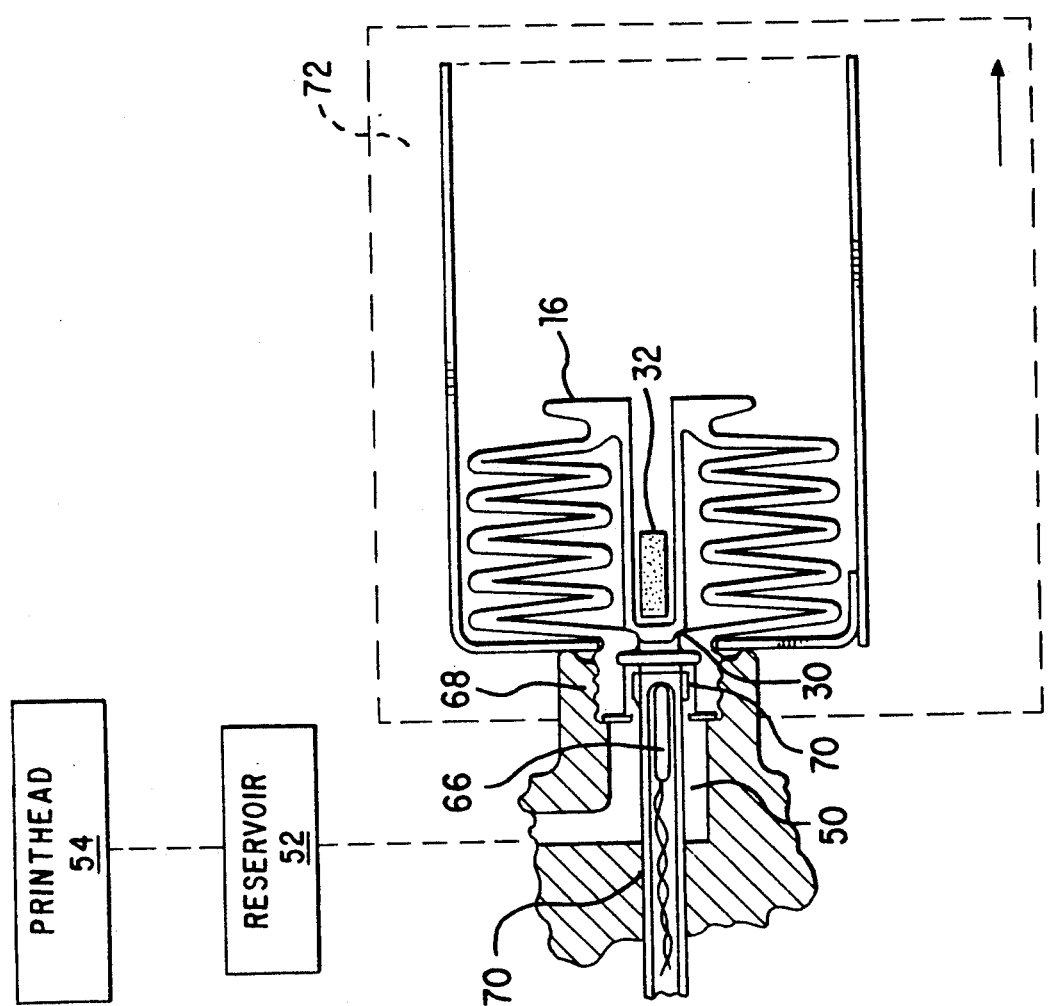
FIG. 3 is a cross-sectional side view of the ink supply of FIG. 2 in a contracted position with an alternative sensing mechanism.

In FIG. 2 there is shown a disposable ink supply container 10 which includes a bellows 12. The bellows 12 includes a first end wall 14, a second end wall 16 and a bellowed side wall 18 which together define a variable volume ink chamber 20 for ink 22. The bellows 12 is movable between an extended position (FIG. 2) and a contracted position (FIG. 3). The first end wall 14 includes an outlet 24 covered by a seal 25. The seal preferably is an aluminum foil seal which is adhesively attached to a periphery of the outlet. When the seal is broken, ink can exit the bellows 12. Preferably, the container also includes a filter 26 located near the outlet 24 and a cap 28 threadably attached to the outlet during storage.

According to a preferred embodiment, the container 10 includes a extension 30 which protrudes from the second end wall 16 of bellows 12 toward the first end wall 14 a predetermined distance. When the bellows contracts to near a completely empty contracted position, an end of the extension mates with the outlet 24 (adjacent to filter 26) to block the flow of ink from the ink chamber so that air is not fed from the supply through the remainder of the printing system. Extension 30 also prevents the leakage of ink from bellows 12 when the bellows is replaced with a fresh ink supply.

The container can also include a magnet 32 (see FIG. 3) located at or near the second end wall 16, preferably near the end of extension 30 furthest away from the second end wall. The magnet 32 can be used with a sensor 66 (described below) located in the ink supply area 72 of the printer to detect the proximity of the magnet (and thus second end wall 16) to the outlet 24. Accordingly, the detection of a near empty condition can be made when the bellows contracts to the nearly empty position. This detection can be used to deactivate the printhead and/or provide an alarm.

The bellows 12 according to a preferred embodiment is contained within a rigid shell 34. The shell 34 is comprised of first end wall 36, second end wall 38, and an intermediate wall 44 joining the first and second end walls 36, 38. The first end wall 36 of the shell 34 includes an opening 41 through which the outlet 24 of the bellows 12 extends. The second end wall 38 of shell 34 includes an aperture 42 through which the second end wall 16 of bellows 12 can be extended and attached to releasably hold the bellows 12 in the extended position until after installation of the container into a printer. Preferably, the second end wall 38 includes an interior retaining wall 40 which contains the aperture 42 as shown in FIG. 2. The interior retaining wall 40 includes at least one frangible breakaway line 45 which extends from aperture 42 (see FIG. 4) to allow the second end wall 16 of the bellows 12 to break free of the end wall 38 after installation to permit contraction of the bellows 12. In this manner, ink will not be forceably ejected from the bellows, even if the foil 25 is removed from outlet 24, until after the second end wall 16 of bellows 12 is released from the second end wall 38 of shell 34. Accordingly, the frangible portion of shell 34 (i.e., end wall 38) acts as a mechanism for activating the ink supply bellows 12.

The bellows 12 can be made from any suitable material which can be formed to be resiliently biased toward a contracted position and which is resistant to the particular liquid ink contained therein. Preferably, the bellows 12 is molded in a contracted position from a suitable plastic, such as, for example, polyester (PET), polypropylene, polyvinyl chloride (PVC), or ethylene vinyl alcohol (EVOH). The rigid shell 34 preferably is made from corrugated cardboard which is inexpensive, light-weight, and disposable. Alternatively, other suitable materials can be used.

Referring to FIG. 3, the ink supply container 10 is adapted to quick connect with an end of a reservoir duct 50 which directly communicates ink 22 from the ink supply 10 to the reservoirs 52 and ultimately to the printheads 54 of the printer 56. The printer 56 includes a housing 58 which includes an ink supply area 72 which houses the ink supply. Any type of conventional quick connect/disconnect coupling can be used at the interface of the reservoir duct 50 and the ink supply outlet 24.

Preferably, sensing means and control means are included in the printer for sensing low (near empty) ink conditions in the ink supply and (optionally) the failure of an operator to place a new ink supply into area 72 properly. FIG. 2 shows an embodiment wherein the sensing means includes a magnet 61, a proximity switch 60, and a metal slide 59. The metal slide 59 is biased toward ink supply 10 by spring 63. The metal slide 59 includes a hole 57. Hole 57 is arranged substantially between magnet 61 and switch 60 when ink supply is correctly attached and not empty. Slide 59 is movable between two grounded positions (not shown). These grounded positions are to the left and right, respectively, of the FIG. 2 position. When slide 59 is in either grounded position, hole 57 is not substantially located between magnet 61 and switch 60. Thus, switch 60 can detect the grounded positions of slide 59 based on the strength of the magnetic force received from magnet 61. When slide 59 is grounded, switch 60 sends a signal to a CPU 62 or other control means. The signal from switch 60 can indicate that either: 1) the container is near empty (slide 59 has moved to the left); or 2) that no container is present (slide 59 has moved to the right due to spring 63). Other types of switches can be used to indicate the 3-positions (grounded left, grounded right, not grounded) of slide 59. Additionally, the signal output by switch 60 when in the left grounded position can differ from the signal output when in the right grounded position so that CPU 62 can discern and indicate whether ink supply 10 is empty or not loaded. Alternatively, CPU 62 can merely indicate that operator intervention is necessary and/or prevent the printhead from operating without indicating the specific problem.

Figure 4:
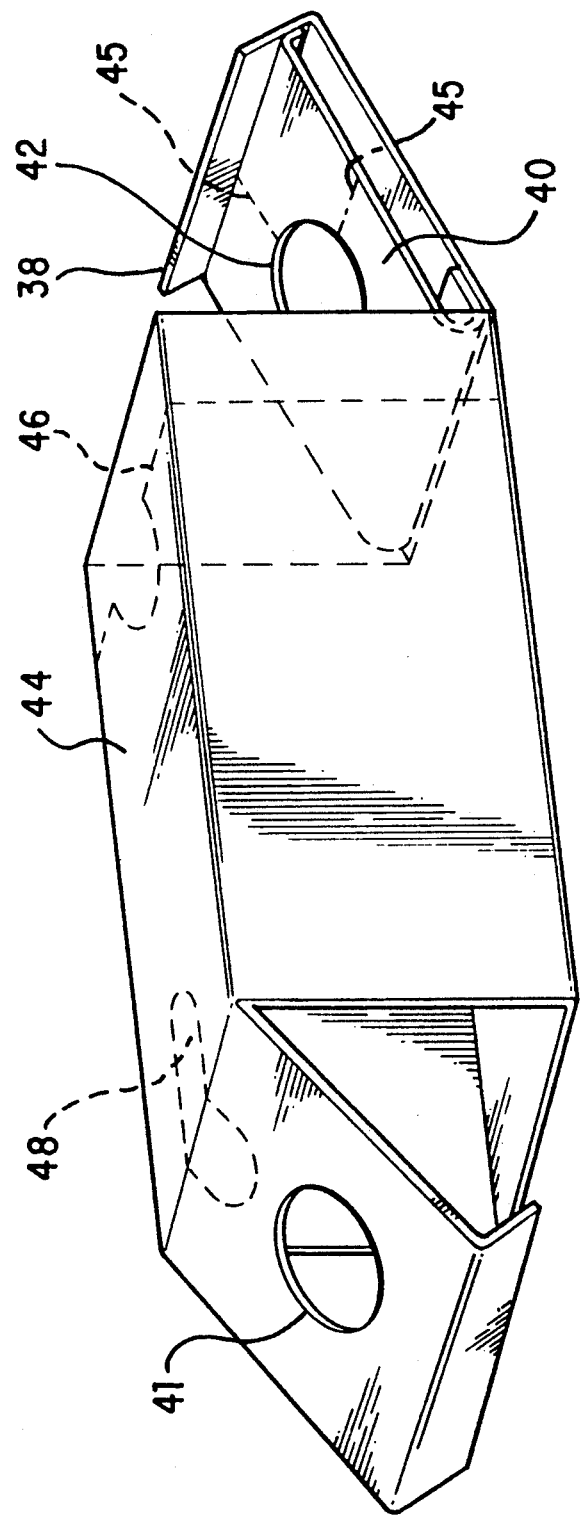
FIG. 4 is a perspective view of a rigid shell which can be used to contain the ink supply.

If the ink supply includes rigid shell 34, the shell must have an alignment aperture or, as shown in FIG. 4, a perforated removable portion which is removed to define alignment aperture 48 so that the slide 59 can pass through the shell 34 to contact the bellows 12. This aperture 48 additionally provides a means for detecting correct orientation of the ink supply 10. If the ink supply 10 is located upside-down in the ink supply area 72, the slide 59 will move to the left and be grounded. The slide 59 will also be grounded if the ink supply 10 is inserted correctly, but the removable portion defining alignment aperture 48 has not been removed. Either condition will send a signal to the CPU 62 indicating that an empty condition exists. The CPU 62 may then send an output signal to a display means 64 to alert an operator that the ink supply 10 requires attention before operation of the printer can proceed. If an operator forgets to insert a fresh ink supply, slide will move to the right grounded position, and switch 60 will again send a signal to CPU 62 indicating that operator attention is needed. Preferably, the printer also includes control means in the CPU 62 to deactivate the printhead to prevent the printhead from operating during an empty or "no ink supply" condition to protect against the ingestion of air into the ink supply system.

Figure 5:
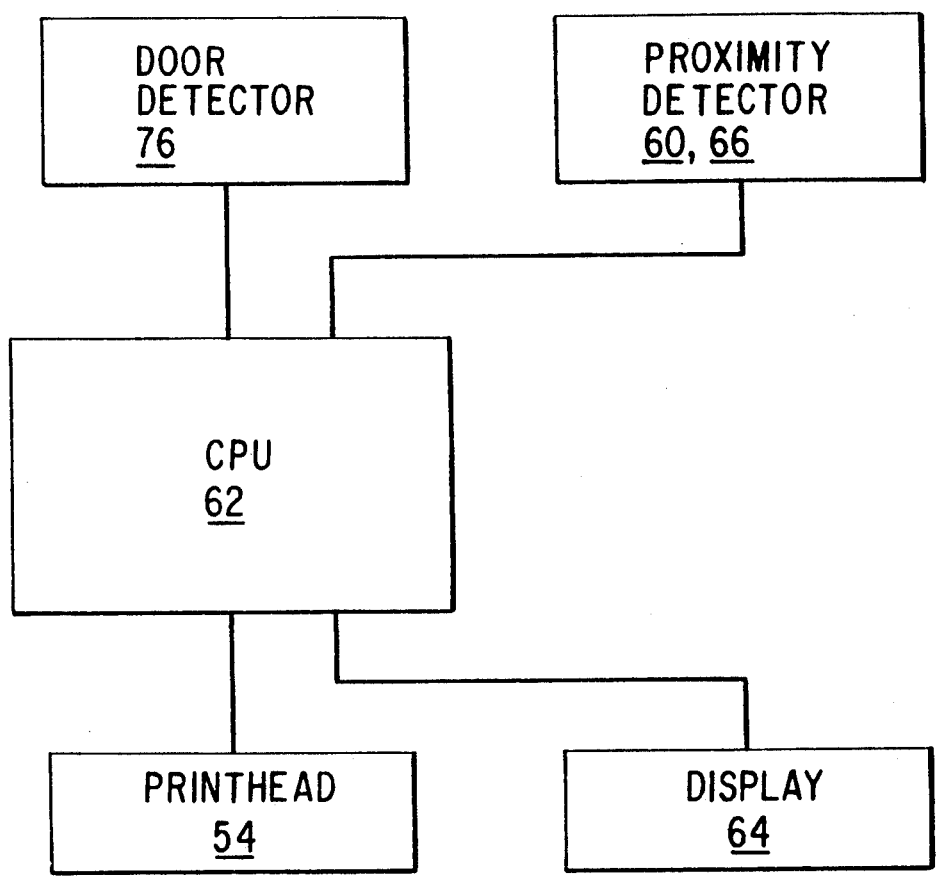
FIG. 5 is a schematic block diagram of a control system for the printer of the present invention.

According to another embodiment, a proximity switch sensor 66 may be included in, for example, an ink reservoir receptacle 68, as shown in FIG. 3. The ink reservoir receptacle 68 communicates through duct 50 with ink reservoir 52 which is in communication with one or more of printheads 54. The proximity switch 66 may be enclosed within a member 70 (shown partially broken away to illustrate switch 66 therein) which is capable of rupturing the seal 25 upon insertion of the ink supply outlet 24 into the receptacle 68. This simplifies installation of the ink supply 10 and provides for a cleaner loading of the ink supply 10 since seal 25 is not ruptured until after outlet is communicated with duct 50. The rupturing member 70 (including the proximity sensor 66) should preferably extend into the outlet 24, upon complete insertion into the receptacle 68, a distance past the end of the outlet 24, but not exceeding the location of the filter 26. In this position, the proximity switch 66 is capable of detecting the presence of magnet 32 in the extension 30 of bellows 12 when the bellows 12 is in or near the contracted position to sense a near empty or empty condition. This sensing may be sent as a signal to a control means, such as CPU 62, which signal can then be processed to send an output signal to display means 64, either visual or audio, to indicate the near empty condition (See FIG. 5), and/or prevent operation of printheads 54. The manner in which information can be displayed, and printheads can be disabled is generally well known and, thus, is not described in any more detail.

Figure 6:
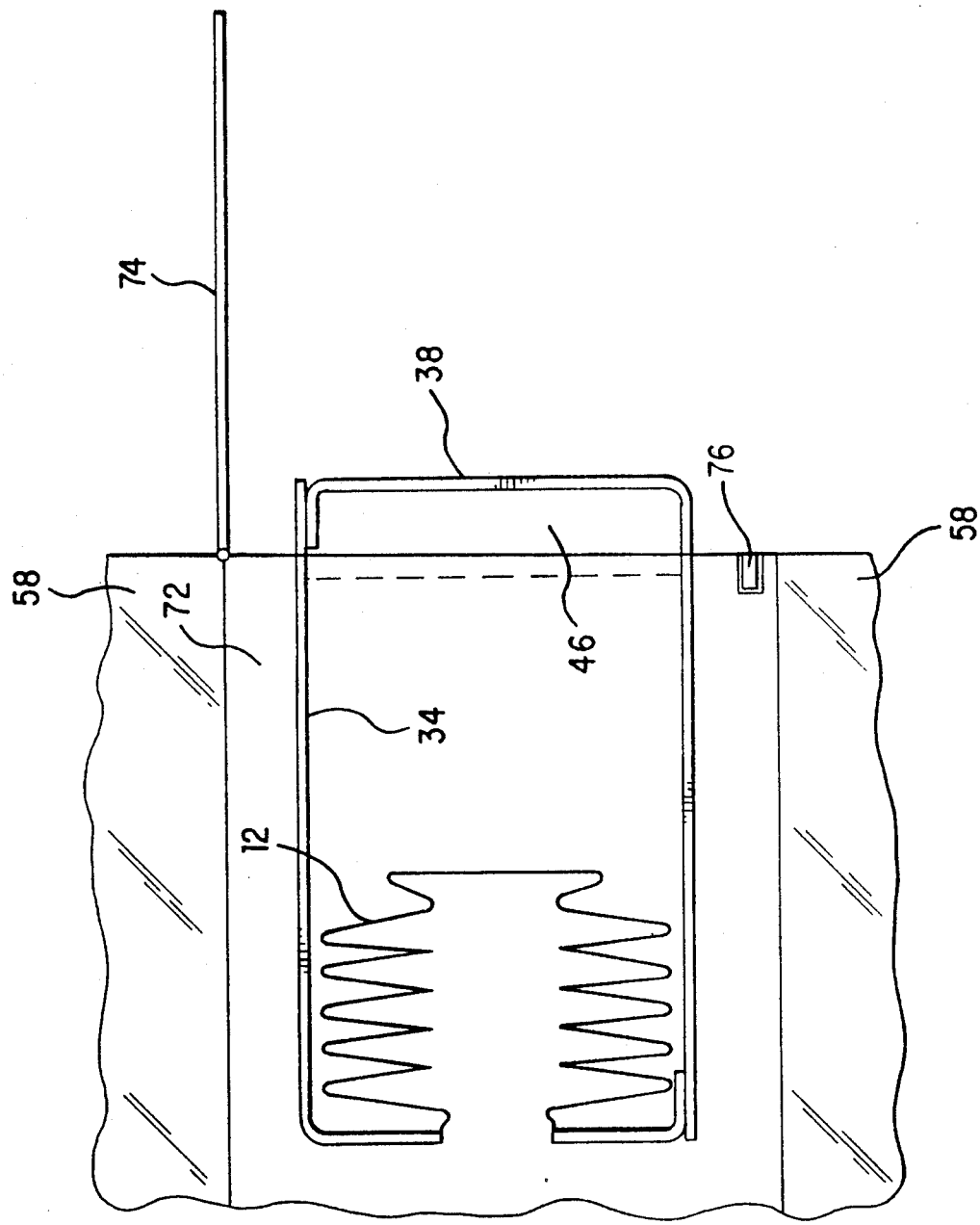
FIG. 6 is a partial side view showing the ink supply in an ink supply area of the printer according to an embodiment of the present invention wherein a frangible portion of the rigid shell prevents a door of the ink supply area from closing until the frangible portion is removed.

The bellows 12 is designed to fit within the size constraints of the ink supply area 72 of the housing 58, as shown in FIGS. 3 and 6. The ink supply area 72 includes a door 74 which is pivotally attached to the housing 58. The door 74 selectively covers and uncovers the ink supply area 72 to allow for normal operation of the machine and to allow access to the ink supply 10. The printer 56 is equipped with a sensor 76 which detects an open door condition. The sensor 76 preferably is a conventional contact switch which activates upon contact with door 74. Since the bellows is not operational until the second end wall 16 is released from the second end wall 38 of the shell 34, it is possible to insert the ink supply 10 into the housing without the ink supply being able to provide ink 22 to the reservoir 52. To insure that the bellows 12 is released from the second wall 38 of shell 34, the rigid shell 34 extends a length slightly greater than a length of the ink supply area 72 such that the door 74 will not close. A portion of the intermediate wall of shell 34 is made frangible to allow an end portion 46 of the rigid shell, including second end wall 38, to be removed from the ink supply. Removal of frangible portion 46 from the remainder of the shell 34 causes frangible line 45 to break, causing second end wall 16 of bellows 12 to be released to an operative position. Complete removal of the frangible portion 46 reduces the length of the ink supply 10 sufficiently to allow door 74 to be closed, thus activating sensor 76. This prevents operation of the printer unless the ink supply 10 is properly installed and the bellows 12 is properly released from a retained position. When second end wall 16 of bellows 12 is attached to second end wall 38 of rigid shell 34, the bellows 12 can be overstretched slightly, but when released, second end wall 16 will retract to a position just inside ink supply area 72.

The invention has been described with reference to its preferred embodiments which are intended to be illustrative and not limiting. For example, while a carriage type printhead is described, the present invention can also be used with pagewidth printheads as disclosed in U.S. Pat. Nos. 4,463,359 to Ayata et al and 4,829,324 to Drake et al, the disclosures of which are incorporated herein by reference. Additionally, the bellows can be more strongly biased to output ink at a high pressure. However, if such a high pressure bellows is used with a printer that operates based upon capillary action, control circuitry would need to be inserted between the ink supply and reservoir to prevent the system from being overwhelmed. Moreover, features such as, for example, the sensors 60, 66, 76, the bellows outlet blocking extension 30, and the frangible rigid shell 34 for maintaining a contractable chamber in its extended position are applicable to any ink supply which includes an ink containing member having at least one movable wall which moves from an extended position to a contracted position as it empties. Various changes can be made without departing from the spirit and scope of the invention as described in the appended claims.

What is claimed is:

1. An ink supply for an ink jet printer, comprising:
a bellows filled with liquid ink, said bellows having first and second opposite end walls and a bellowed side wall attached to and extending between said first and second end walls to define a variable volume ink chamber, said bellows being movable between an extended position and a contracted position and being biased toward said contracted position, said first end wall having an outlet which, when opened, permits said ink to be expelled from said bellows; and
a rigid shell surrounding said bellows, said rigid shell having first and second end walls, said outlet extending through said first end wall of said shell, said second end wall of said bellows being releasably attached to said second end wall of said shell so that said bellows cannot contract until said second end wall of said bellows is released from said second end wall of said shell.

2. The ink supply of claim 1, wherein said bellows expels said liquid ink from said outlet at a low pressure of less than one inch of $H_2O$.

3. The ink supply of claim 1, further comprising:
a filter extending across said outlet.

4. The ink supply of claim 1, wherein said second end wall of said bellows includes an extension which protrudes into said chamber toward said first end wall of said bellows, said extension blocking said outlet when said bellows contracts by an amount sufficient to cause said second end wall of said bellows to come within a predetermined distance of said outlet.

5. The ink supply of claim 4, further comprising a magnet located in said extension.

6. The ink supply of claim 1, further comprising a magnet attached to said second end wall of said bellows.

7. The ink supply of claim 1, wherein said second end wall of said shell includes an aperture, and said second end wall of said bellows is releasably attached to said second end wall of said shell by being inserted through said aperture.

8. The ink supply of claim 7, wherein said second end wall of said shell is frangible from an intermediate portion of said shell to release said second end wall of said bellows.

9. The ink supply of claim 1, wherein said shell includes an intermediate wall which extends between said first and second end walls of said shell and surrounds said bellowed side wall of said bellows, said second end wall of said shell and a portion of said intermediate wall being frangible from a remaining portion of said intermediate wall of said shell so that a length of said ink supply is reduced by removal of said second end wall of said shell and said frangible portion of said intermediate wall.

10. The ink supply of claim 1, wherein said first end wall of said shell includes at least one alignment aperture therein.

11. An ink supply for an ink jet printer, comprising:
a container defined by at least one wall which is movable between an extended position and a contracted position to define a variable volume chamber, said container being filled with fluid ink, said at least one wall having an outlet and an extension attached to a portion of said at least on wall which moves as fluid ink exits said container, said extension blocking said outlet when said container is almost empty.

12. The ink supply of claim 11, wherein said at least one wall defines first and second opposed ends of said container said first end containing said outlet, said extension attached to said second end, and said at least one wall is movable so that said second end approach said first end as said fluid ex said container.

13. The ink supply of claim 11, further comprising a magnet attached to a portion of said at least one wall which moves as said fluid ink exits said container.

14. The ink supply of claim 11, wherein said container is biased toward said contracted position.

15. The ink supply of claim 13, wherein said magnet is located in said extension.

16. The ink supply of claim 11, wherein said at least one movable wall is a bellows having first and second opposite end walls and a bellowed side wall attached to and extending between said first and second end walls, said outlet being attached to said first end wall, and said extension being attached to said second end wall.

17. An ink supply for an ink jet printer comprising:
a container defined by at least one wall which is movable between an extended position and a contracted position to define a variable volume chamber, said container being filled with fluid ink, said at least one wall having an outlet; and
a rigid shell surrounding said container, said outlet extending through an aperture in a first surface of said rigid shell, said at least one movable wall being releasably attached to a second surface of said rigid shell so that said at least one wall defining said container cannot contract until said at least one wall is released from said second surface of said rigid shell.

18. The ink supply of claim 17, wherein said second surface of said rigid shell is located on a removable portion of said rigid shell which is frangible from a remaining portion of said rigid shell, so that said at least on wall is released from said second surface of said rigid shell when said removable portion is separated from said remaining portion of said rigid shell.

19. The ink supply of claim 17, wherein said container is biased toward said contracted position.

20. The ink supply of claim 17, wherein said at least one movable wall is a bellows having first and second opposite end walls and a bellowed side wall attached to and extending between said first and second end walls, and wherein one of said first and second end walls is releasably attached to said second surface of said rigid shell.

21. An ink jet printer comprising:
a housing;
a printhead located in said housing;
an ink supply area located in said housing for receiving a disposable ink supply;
a disposable ink supply removably located in said ink supply area and having at least one movable wall defining a variable volume chamber which is movable between an extended position and a contracted position when said ink supply is full and empty, respectively, said ink supply being filled with ink and said at least one movable wall including a moving portion which moves between a first position when said ink supply is full and extended, and a second position when said ink supply is empty and contracted, said movable wall having an outlet;
means for conveying ink from said outlet of said disposable ink supply when located in said ink supply area to said printhead; and
means for determining that said printer will not operate properly by detecting a position of a wall of said disposable ink supply, said means for determining including a switch which is activated by contact with said moving portion when said moving portion moves to said second position.

22. The printer of claim 21, wherein said switch includes a movable member which moves to a first grounded position when said ink supply is not inserted into said ink supply area, a second grounded position when said ink supply is inserted into said ink supply area and said moving portion is moved to said second position, and a third position, located between said first and second grounded positions, when said ink supply is inserted into said ink supply area and sufficient ink remains in said ink supply for said printer to operate properly, said switch being activated to indicate a non-operative state of said printer when said movable member is in either of said first or said second grounded position.

23. The printer of claim 21, wherein said at least one movable wall is a bellows having first and second opposite end walls and a bellowed side wall attached to and extending between said first and second end walls, said outlet being attached to said first end wall.

24. The ink supply of claim 21, wherein said container is biased toward said contracted position.

25. An ink jet printer comprising:
a housing;
a printhead located in said housing;
an ink supply area located in said housing for receiving a disposable ink supply;
a disposable ink supply removably located in said ink supply area and having at least one movable wall defining a variable volume chamber which is movable between an extended position and a contracted position when said ink supply is full and empty, respectively, said ink supply being filled with ink and said at least one movable wall having an outlet;
means for conveying ink from said outlet of said disposable ink supply when located in said ink supply area to said printhead;
means for determining that said printer will not operate properly by detecting a position of a wall of said disposable ink supply; and
a door pivotally attached to said housing for selectively covering and uncovering said ink supply area; said ink supply including:
a rigid shell surrounding said at least one movable wall, said outlet extending through an aperture in said rigid shell, said at least one movable wall being releasably attached to said rigid shell so that said variable volume chamber defined by said at least one movable wall cannot contract until said at least one movable wall is released from said rigid shell, a frangible portion of said rigid shell being removable from a remaining portion of said rigid shell to release said at least one movable wall, said disposable ink supply becoming operative to supply ink at a positive pressure when said frangible portion is removed, said rigid shell having a length which is longer than a length of said ink supply area, and said remaining portion having a length which is less than the length of said ink supply area, so that said rigid shell extends out of said ink supply area and prevents said door from being closed until said frangible portion is removed;
wherein said means for determining determines whether said printer will operate properly by detecting whether said door is closed.

* * * * *